(12) United States Patent
Walters et al.

(10) Patent No.: US 11,651,152 B2
(45) Date of Patent: May 16, 2023

(54) CONCISENESS RECONSTRUCTION OF A CONTENT PRESENTATION VIA NATURAL LANGUAGE PROCESSING

(71) Applicant: Capital One Services, LLC, McLean, VA (US)

(72) Inventors: Austin Walters, McLean, VA (US); Anh Truong, McLean, VA (US); Jeremy Goodsitt, McLean, VA (US); Vincent Pham, McLean, VA (US); Galen Rafferty, McLean, VA (US); Reza Farivar, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 57 days.

(21) Appl. No.: 17/344,522

(22) Filed: Jun. 10, 2021

(65) Prior Publication Data

US 2021/0326523 A1    Oct. 21, 2021

Related U.S. Application Data

(63) Continuation of application No. 16/851,049, filed on Apr. 16, 2020, now Pat. No. 11,042,700.

(51) Int. Cl.
*G06F 16/34* (2019.01)
*G06F 40/197* (2020.01)
(Continued)

(52) U.S. Cl.
CPC .......... *G06F 40/197* (2020.01); *G06F 16/345* (2019.01); *G06F 40/117* (2020.01); *G06F 40/169* (2020.01); *G06F 40/40* (2020.01); *G06N 3/00* (2013.01); *G06N 20/00* (2019.01); *H04L 67/02* (2013.01)

(58) Field of Classification Search
CPC .... G06F 16/345; G06F 40/117; G06F 40/197; G06F 40/169; G06F 40/40; G06N 3/00; G06N 20/00; G06N 3/0445; G06N 3/084; H04L 67/02
See application file for complete search history.

(56) References Cited

U.S. PATENT DOCUMENTS

2004/0044519 A1* 3/2004 Polanyi .................... G06F 40/35
                                                       707/E17.058
2014/0156567 A1* 6/2014 Scholtes ................... G06N 5/02
                                                       706/12
(Continued)

*Primary Examiner* — Sanchita Roy
(74) *Attorney, Agent, or Firm* — Perkins Coie LLP (57) ABSTRACT

A method may include obtaining a document and using a first prediction model to generate text block scores for text blocks in the document, where a first text block of the text blocks is associated with a first text block score of the plurality of text block scores. The method also includes updating, in response to the first text block score for the first text block failing to satisfy a criterion, a modified version of the document with an indicator to set the first text block as a hidden text block in a presentation of the modified version. The method also includes generating a summarization of the first text block based on the words in the first text block and updating the modified version of the document to include the summarization. The method also includes providing the modified version of the document to a user device.

20 Claims, 3 Drawing Sheets

(51) Int. Cl.
*G06F 40/169* (2020.01)
*G06N 20/00* (2019.01)
*G06F 40/117* (2020.01)
*G06F 40/40* (2020.01)
*H04L 67/02* (2022.01)
*G06N 3/00* (2023.01)

(56) References Cited

U.S. PATENT DOCUMENTS

| | | | |
|---|---|---|---|
| 2018/0144188 A1* | 5/2018 | Evanitsky | G06F 16/3322 |
| 2018/0157628 A1* | 6/2018 | Hollingsworth | G06F 3/0482 |
| 2018/0300400 A1* | 10/2018 | Paulus | G06F 40/58 |
| 2018/0349447 A1* | 12/2018 | MacCartney | G06F 16/24578 |
| 2019/0155910 A1* | 5/2019 | Dockhorn | G06F 40/30 |
| 2019/0349321 A1* | 11/2019 | Cai | G06F 40/237 |
| 2020/0050638 A1* | 2/2020 | Hancock | G06F 16/90344 |
| 2020/0125671 A1* | 4/2020 | Li | G06F 16/335 |
| 2020/0210647 A1* | 7/2020 | Panuganty | G06N 20/10 |

* cited by examiner

CONCISENESS RECONSTRUCTION OF A CONTENT PRESENTATION VIA NATURAL LANGUAGE PROCESSING

CROSS REFERENCE TO RELATED APPLICATIONS

This application is a continuation of U.S. patent application Ser. No. 16/851,049, filed on Apr. 16, 2020. The contents of which are hereby incorporated by reference in its entirety.

FIELD

The invention relates to content presentation modification, including, for example, natural language processing of a document, increasing text conciseness related to a document presentation using natural language processing, etc.

BACKGROUND

Conventional written information sources such as journal papers, news articles, and contracts are useful sources of information. However, a document may be written with the needs of multiple target audiences in mind, which may result in the document incorporating information that is irrelevant to any single demographic. This may cause delays in responding to the information or cause incorrect interpretation of important information. Increasing the conciseness of a documents may decrease the response time needed to respond to information provided by the document and increase the accuracy of interpretations of the information provided by the document.

SUMMARY

Aspects of the invention relate to methods, apparatuses, media, and/or systems for reconstructing document presentation using natural language processing.

In some embodiments, a document comprising a plurality of words may be obtained. A natural language model may be used to generate a plurality of text block scores for text blocks in the document. A first text block of the text blocks may be associated with a first text block score of the plurality of text block scores. The first text block may include a sequence of words. In response to the first text block score for the first text block failing to satisfy a criterion, a modified version of the document may be updated to include an indicator. The indicator may be associated with the first text block and may set the first text block as a hidden text block in a presentation of the modified version. The modified version of the document may be provided to a user device in response to a user device associated with a user sending a request to access the document.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
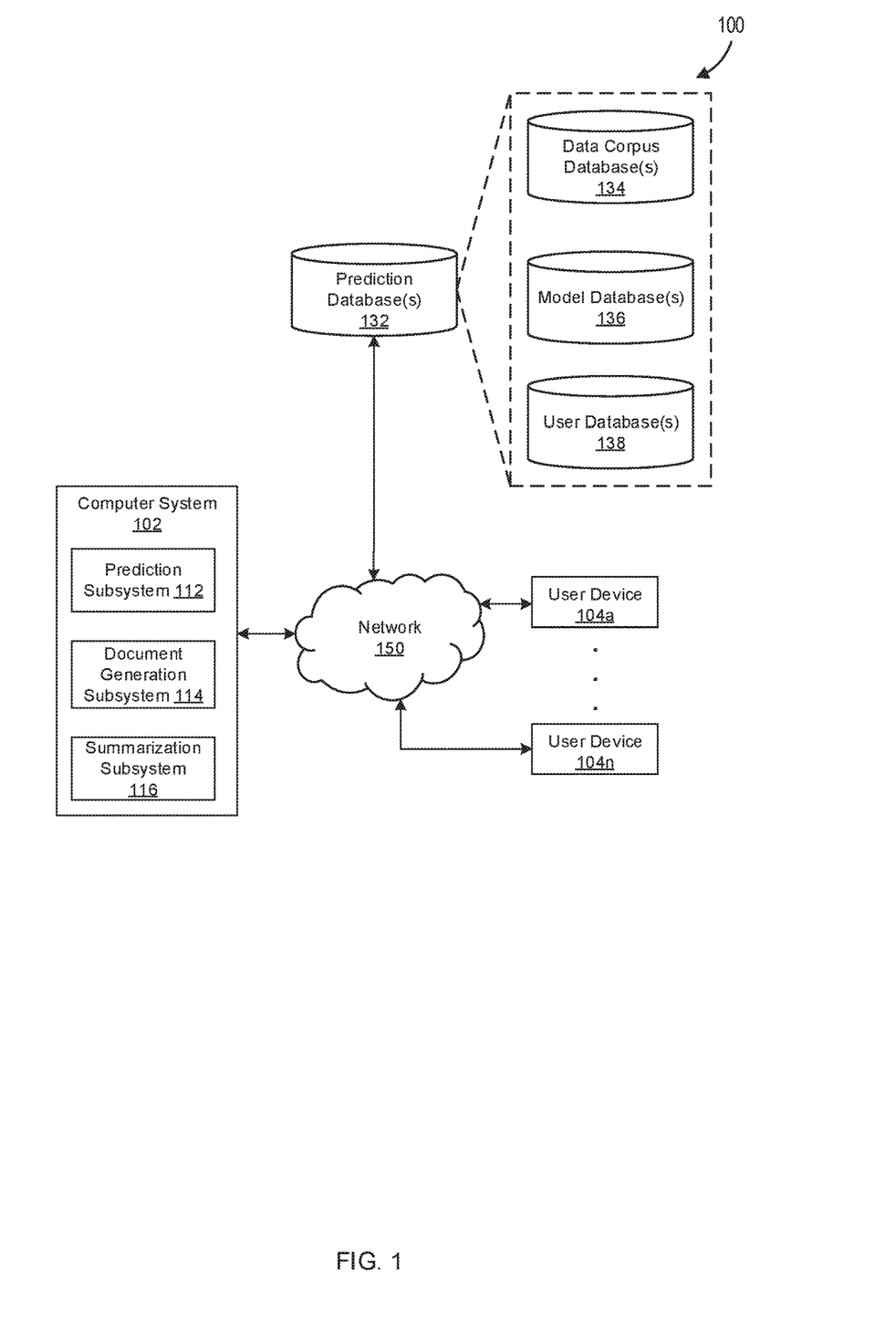
FIG. 1 show a system for facilitating content presentation modification, in accordance with one or more embodiments.

FIG. 1 shows a system 100 for facilitating content presentation modification, in accordance with one or more embodiments. As shown in FIG. 1, system 100 may include computer system 102, user device 104 (or user devices 104a-104n), or other components. Computer system 102 may include a prediction subsystem 112, document generation subsystem 114, summarization subsystem 116, and/or other components. Each user device 104 may include any type of mobile terminal, fixed terminal, or other device. By way of example, user device 104 may include a desktop computer, a notebook computer, a tablet computer, a smartphone, a wearable device, or other user device. Users may, for instance, utilize one or more user devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of user device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, the system 100 may generate a markup text based on a document. Markup text may include any text written in a markup language, such as TeX, the Hypertext Markup Language (HTML), extensible markup language (XML), yet another markup language (YAML), or the like. For example, the system 100 may obtain a document in the form of generated HTML code from a web article, use a natural language processing model to categorize elements of the text, and generate markup text to display the prioritized information. In some embodiments, the system 100 may analyze obtained text in order to categorize specific sections of the text (e.g., sentences, paragraphs) and determine which sections of the text should be displayed or summarized for a user. Once appropriately categorized, the system 100 may generate markup text that may be interpreted by a browser or graphical display program to display, summarize, or hide sections of the text.

In some embodiments, the system 100 may use one or more natural language processing models to categorize sections of text based on or more criteria. Example criteria may indicate whether the section of text on-topic or off-topic, interesting or not interesting to a user, or important or not important based on a user preference profile. The system 100 may then perform different operations on the text sections based on the labels associated with those sections. These operations may include generating tags or user interface (UI) elements to indicate which sections of the text are to be displayed and which sections of the text are to be hidden. In some embodiments, a natural language processing model may be trained or otherwise updated to improve the categorization of text sections with respect to accuracy and user preferences.

In some embodiments, the system 100 may also summarize one or more text sections of a document to generate one or more summarizations. For example, the system 100 may determine that a first block of the text is to be hidden and, in response, generate a string summarizing the first block of text. The system 100 may then insert the string into the markup text with an associated tag to indicate that the inserted string is a summarization. In some embodiments, summarizing a text block may include extractive summarization methods, such as extracting one or more words from the text section. As an example, the system 100 may determine that a text block is labeled as "off-topic" and, in response, insert the tag '<div property="collapsible">' before the text block in the markup text. Alternatively, or in addition, summarizing a text block may include abstractive summarization methods, where the summarization string is dynamically generated and may include phrases not in the text block being summarized. As further described below, the natural language processing models may be trained or otherwise updated to improve the summarization of text blocks.

In some embodiments, the natural language processing model or prediction models of the natural language processing model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
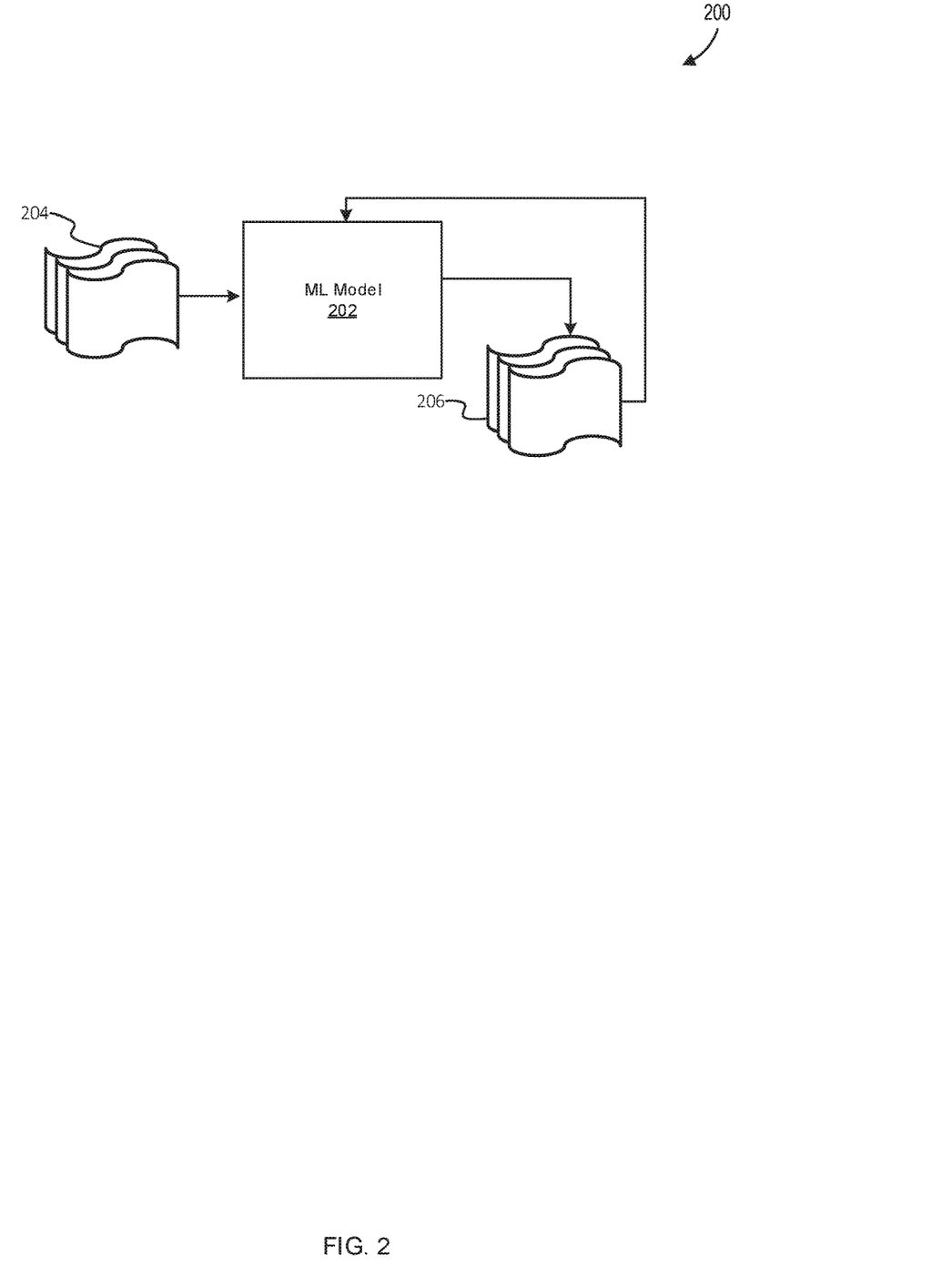
FIG. 2 shows a machine learning model configured to label text blocks of a document, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of the outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-116

In some embodiments, the prediction subsystem 112 may be trained based, at least in part, on one or more datasets obtained from data corpus database(s) 134. The data corpus database(s) 134 may include one or more data corpora configured to store a plurality of documents. A document may include pure text documents, markup text that includes elements from a markup language, mixed text and image documents, formatted document data (e.g., PDF, XPS, etc.), or the like. In some embodiments, the markup text may be a web document, where a web document may be any document that is transmittable over the Internet and may be static web document, dynamic web document, or active web document. For example, a web document may include a static web page written in the hypertext markup language (HTML). In addition, a document may also include web application data that contains text displayable on a graphical display, such as a web application that includes Javascript code, a cascading stylesheet (CSS), and HTML text. In some embodiments, the data corpora may also include web addresses for Internet web pages, where the system may access the web documents stored at the web addresses when using the data corpus database(s) 134.

In some embodiments, the documents stored in the data corpus database(s) 134 may be used to train a prediction model stored in the model database(s) 136. In some embodiments, the number of documents stored within the data corpus database(s) 134 may be 100 or more documents, 1,000 or more documents, 1,000,000 or more documents, etc. The data corpus database(s) 134 may also store datasets of other data associated with the documents, such as conciseness metrics, links to source data, images, document metadata, document topics associated with a document, indicators indicating which text blocks of the document satisfy or do not satisfy one or more display criteria, or the like.

The prediction subsystem 112 may label which of a set of text blocks in a document do not satisfy one or more display criteria, where a text block may be defined as set of words. Example text blocks may include a sentence, a plurality of sentences, a paragraph, a plurality of passages, a chapter, or the like. While a word may be treated as a set of characters delimited by white spaces and punctuation characters in a Germanic language (e.g., English, German, Dutch, etc.) or Romance language (e.g., Spanish, Portuguese, French, etc.), a word may be differently-delimited in other languages. For example, a word may be defined as either a single character or set of related characters in Mandarin Chinese based on words stored in a Chinese dictionary package. As further described below, the prediction subsystem 112 may include machine learning models, statistical models, and other prediction systems to determine which text blocks to hide in a document. The prediction models used by the prediction subsystem 112 or their associated prediction model parameters may be stored in model database(s) 136. The prediction subsystem 112 may use a plurality of prediction models concurrently and compare the results to different criteria. For example, the prediction subsystem 112 may predict text block scores of various types, such as scores that indicate which paragraphs of a document are on-topic or off-topic, related or unrelated to other paragraphs of the document, or of-interest or not-of-interest to a user. The prediction subsystem 112 may compare these scores to display criteria associated with each type of the text block score. Based on the comparison, the prediction subsystem 112 may determine whether the respective paragraphs should be set to be hidden.

In some embodiments, the prediction subsystem 112 may also be used to predict future documents that may be accessed by a user. For example, some embodiments may include user data associated with a user or user device, where the user data may be stored in the user database(s) 138. The user data may include a history of previously accessed documents, which may be stored as text documents, hyperlinks, PDFs, or the like. The set of previously-accessed documents may be used to train one or more prediction models of the prediction subsystem 112 to predict future documents that may be accessed by the user. For example, in some embodiments, the prediction subsystem 112 may obtain a set of recently-published articles from the data corpus database(s) 134. The prediction subsystem 112 may predict which of the set of recently-published articles a user would be likely to access based on the user's viewing history. In some embodiments, the prediction subsystem 112 may then pre-emptively label text blocks of each of the set of likely-to-access documents based on a set of display criteria.

In some embodiments, the prediction subsystem 112 may also access the user data stored in the user database(s) 138 to retrieve other information, such as a credit history, investment history, financial transaction history, or the like. The prediction subsystem 112 may include subroutines that retrieve one or more lists of terminology associated with companies that a user has investments in or is otherwise associated with. The prediction subsystem 112 may then categorize each text block having one or more words from the list of terms listed as "of-interest" with respect to the user. In some embodiments, the prediction subsystem 112 may determine that the text block is to be displayed or otherwise not hidden, even if the text fails other display criteria. For example, the prediction subsystem 112 may retrieve a list of terminology for a user that has an investment in a firm titled "Candyburst Kitten Company", where the list of terminology may include strings associated the firm such as "candy burst" and "candyburst kitten." The prediction subsystem 112 may then label all text blocks that include at least one of the strings "candy burst" and "candyburst kitten" as "of-interest" and satisfying a user-specific display criterion, as further described below.

The document generation subsystem 114 may update one or more modified versions of a document based on the output of the prediction subsystem 112. In some embodiments, the document generation subsystem 114 may receive text from an obtained document as input and generate a web application as a modified version of the document, where the text from the obtained document may be stored in one or more various sections of the web application. For example, each paragraph of an obtained document may be stored as individual constants in the web application, and the document generation subsystem 114 may generate a web application that includes one or more text blocks of the document after loading by including code to display the constants.

As further described below, the modified version of the document may include code to generate one or more UI elements to show text blocks that may be initially hidden in a presentation of the modified version of the document on a user device. A UI element of an application may include various types of elements that a user may interact in order to change a visual effect of the application, change a state of the application, or otherwise cause one or more routines of the application to execute. Example UI elements may include a hyperlink, button, an invisible box, a dropdown menu, a collapsible accordion, breadcrumb, slider, modal window, popup, movable card, dropdown, or the like. In some embodiments, a text block of a modified version of the document may be initially hidden from a viewer in response to a text block score of the text block failing to satisfy one or more display criterion. In some embodiments, the document generation subsystem 114 may also include operations to graphically indicate one or more properties of text being hidden. For example, the document generation subsystem 114 may update a modified version of a document such that a text block to be hidden includes a graphical icon indicating that a hidden text block is hidden for failing to satisfy an "on-topic" criterion.

The summarization subsystem 116 may generate a summarization of one or more text blocks, such that the text blocks that do not satisfy one or more display criteria. As further described below, the summarization subsystem 116 may use various extractive summarization models or abstractive summarization models to generate a summarization of text blocks. For example, the summarization subsystem 116 may use models or model parameters stored in the model database(s) 138 to generate a summarization of a text block. The parameters used by the summarization subsystem 116 may be trained using documents stored in the data corpus database(s) 134. As further discussed below, example summarization models used may include statistical models, recurrent neural networks, transformer models, point generation neural networks, or other models.

Example Flowchart

Figure 3:
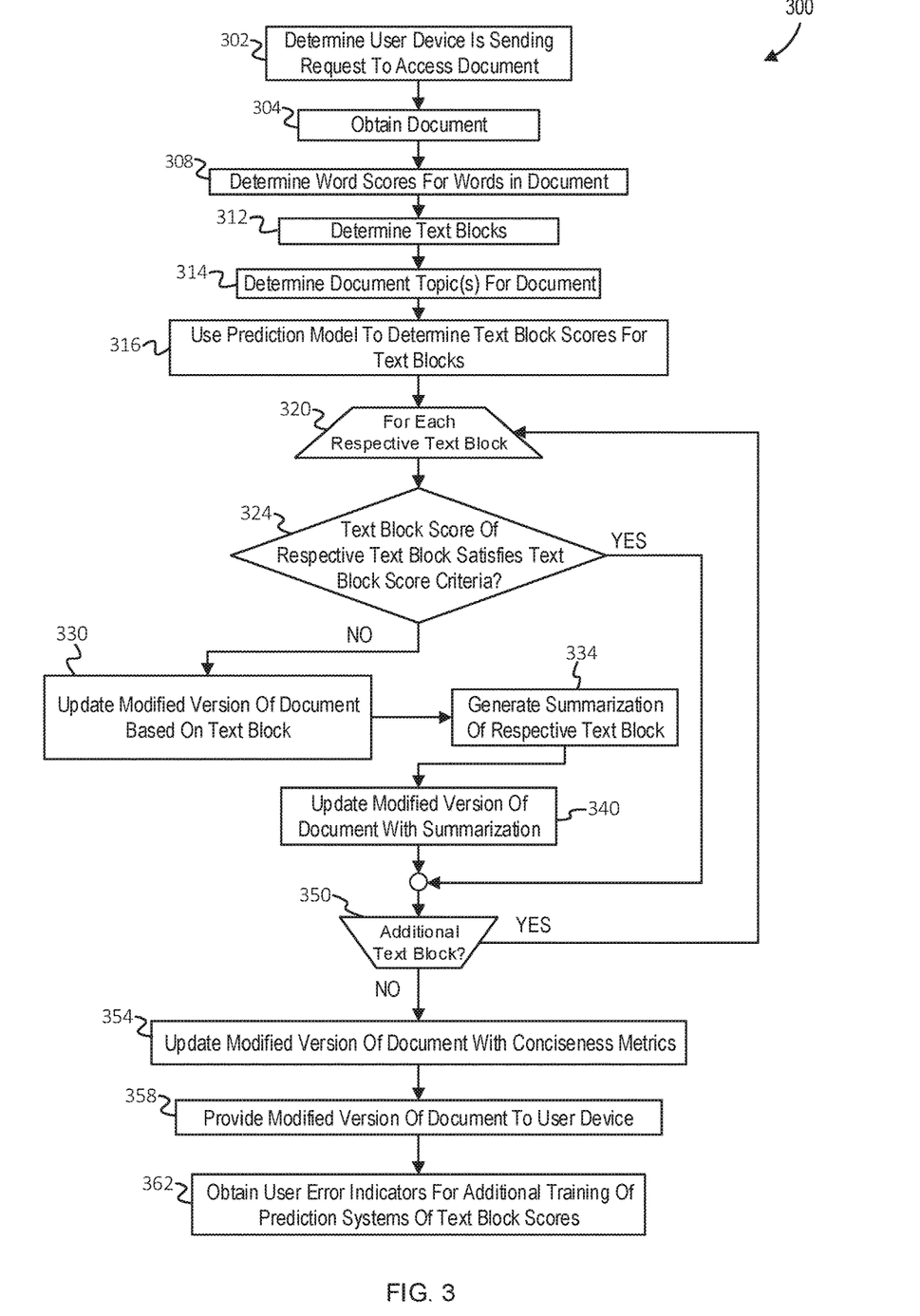
FIG. 3 shows a flowchart of operations to label text blocks of a document and generate a modified version of a document based on the labels, in accordance with one or more embodiments.

FIG. 3 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. For example, some embodiments may perform operations of the method 300 without performing operations to generate the summarization described for the operation 340. Additionally, the order in which the processing operations of the methods are illustrated (and described below) is not intended to be limiting. For example, while the operation 334 is shown to occur before the operation 340 as further described below, some embodiments may update a modified version of a document with an indicator indicating that a respective text block is to be set as hidden after updating the modified version of the document with a summarization of the respective text block.

In some embodiments, the methods may be implemented in a system that includes one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of operations to label text blocks of a document and generate a modified version of a document based on the labels, in accordance with one or more embodiments. Operations of the method 300 may begin at operation 302. In the operation 302, the system may determine that a user device has sent a request to access a document. In some embodiments, a user device sending a request to access a document may indicate that a user is accessing a document. In some embodiments, the operations described further below may be initiated in response to the user accessing the document. Alternatively, one or more of the operations below may be performed before the user accesses the document. For example, obtaining the document and generating a modified version of the document as described further below may be performed before the user accesses the document. The modified version of the document may then be sent to a user device in response to the user of the user device accessing or attempting to access the document.

In some embodiments, the user may indicate they are accessing a document by interacting with a UI element that is part of a native application on a computing device, a web application, or an add-on application of a web browser application. For example, a user may access a news article web document and then click on a button that is part of an add-on to a web browser to send a message to the system that the user is accessing the web document and cause one or more of the operations described below to be performed. Alternatively, or in addition, an application may detect that a user device has sent a request to access a document and perform one or more operations of the method described below without further input from a user or user device. For example, an add-on application being executed by a user device may detect that a request for a document has been sent by a user device to a web address. The add-on application may include a routine that will then send a message to a computer system such as the computer system 102 via an API of the computer system 102. As further described below, the computer system 102 may then retrieve or generate a modified version of the document to be sent back to the user device.

In the operation 304, documents may be obtained. In some embodiments, a server executing the system may obtain a document via a user device. For example, the system may obtain the web document after the web document is loaded onto a web browser. Alternatively, or in addition, the system may obtain the web document by retrieving a web address and retrieving the web document directly from the Internet. For example, after the system determines that the user device has sent a request to access a web document associated with the web address "http://www.uspto.gov", the system may retrieve the web document by accessing "http://www.uspto.gov" directly.

In some embodiments, the system may obtain the document before a user device sends a request to access the document. For example, the system may predict that a user is likely to access the document and, in response to this determination, obtain the document before receiving a message that the user device requested the document. In some embodiments, the system may predict that a user is likely to access the document based on a prediction model. A prediction model may include one or more machine learning models such as a neural network model, Naïve Bayes classifier, or the like. For example, the system may train a neural network using a set of previously-accessed web documents to predict what future web documents a user may access. The system may partition the history of web documents accessed by a user into a first subset of previously-accessed web documents having access timestamps before a specified time and a second subset of previously-accessed web documents having access timestamps after the specified time. The system may then train the neural network to predict a set of documents that will be accessed by the user based on a history of previously-accessed documents. The system may then use some or all of the previously-accessed web documents associated with a user as an input for the trained neural network to predict a set of documents that the user is likely to access in the future. The system may then perform operations similar to or identical to the operations described below to generate modified versions of the likely-to-access documents.

In some embodiments, the system may use optical character recognition (OCR) methods to convert text for subsequent processing, as described further below. The system's use of OCR methods may be advantageous for text that is not directly provided. For example, the system may apply OCR methods to process a rendered image of a web document and detect the presence of one or more words in the rendered image. As described further below, these words may then be processed to determine word scores or text block scores, which may then be used to determine which of the text blocks of the document to display.

In an operation 308, a set of word scores for the words in the document may be generated. In some embodiments, each of the set of word scores may include one or more values, such as a set of values represented as a vector. In some embodiments, the word score may be or otherwise include a vector in a vector space determined using an embedding operation. For example, some embodiments may use a neural network embedding model such as the word2vec model to determine a word score. Using a context-independent embedding model such as a word2vec model may include using a neural network to determine a vector based on the word. Alternatively, or in addition, word scores may be generated using other context-independent embedding models such as the Global Vectors for Word Representation model ("GloVe"). Alternatively, or in addition, word scores may also be generated using context-dependent embedding models such as ELMo, BERT, and Context2Vec. Using context-dependent embedding models may increase the accuracy of later interpretations.

In an operation 312, the system may determine a set of text blocks based on the document. Each text block may include a set of words in the document, and may represent a phrase, sentence, plurality of sentences, a paragraph, plurality of paragraphs, or the like. For example, each text block in a document may be a paragraph of the document. In some embodiments, the system may determine the set of text blocks based on a known set of delimiter characters, such as a set of whitespace characters or punctuation characters. For example, the system may include a subroutine to partition a document into text blocks based on newline characters that may be represented in Unicode by the Unicode character "U+2424". Alternatively, or in addition, the system may determine set of text blocks based on the presence of specific markup tags. For example, the system may determine a set of text blocks based on the text strings in an HTML web document using one or more bracket-containing tags such as "<br/>," "<div>", or "<p>" as delimiters. Each text block may include one or more words.

As described above, some embodiments may obtain words using OCR methods on a rendering of a web document. In some embodiments, text blocks may be determined from words obtained after rendering of the web document by detecting spatial relationships between text detected using an OCR method. For example, some embodiments may use image recognition methods to determine boundaries of text in spatial proximity to each other and assign the words in the boundaries of text as text blocks.

In an operation 314, one or more document topics for the document may be determined. As discussed further below, some embodiments may use one or more document topics to determine a text block score that measures whether a text block is on-topic or off-topic with respect to the one or more document topics of the document. In some embodiments, the document topic may be pre-determined or otherwise extracted from a pre-determined field. Some embodiments may determine the topic of a web document using metadata associated with the web document, such as data stored in a "<meta>" tag of an HTML document. For example, a document topic may be set as "pandas" after obtaining a web document that includes the tag "<meta topic="pandas">. Alternatively, or in addition, some embodiments may obtain a document topic for a document based on known values associated with the document that is stored in a database. For example, a document may be stored in a database and associated with a list of known topics, and the system may obtain the list of known topics when obtaining the document from the database.

In some embodiments, a document topic may be obtained using an unsupervised learning model to perform a topic modeling operation to determine one or more document topics. The unsupervised prediction method may include analysis methods such as latent Dirichlet allocation (LDA), latent semantic analysis (LSA), probabilistic latent semantic analysis (PLSA), discrete principal component analysis (discrete PCA), or the like. For example, some embodiments may tokenize, lemmatize and stem a document and then use an LDA model to determine topics of the document. In some embodiments, the unsupervised topic modeling method may be combined with a supervised topic modeling method. For example, the prediction model may use a LDA2vec model, which may include use of an LDA model with a trained neural network embedding model.

In some embodiments, a document topic may be obtained by categorizing the document from a list of pre-determined topics using a neural network. For example, some embodiments may use a neural network to categorize a primary topic and secondary to a document form a set of labels that include the document topics "sports," "entertainment," "neural networks," and "ice fishing." The neural network may first be trained on a data corpus that includes documents and an associated set of known topics. The trained neural network may then be used to classify a new document as having a document topic of "ice fishing."

In an operation 316, a prediction model may be used to determine text block scores for the text blocks. The prediction model may be used as a part of natural language processing model, where using a natural language processing model may include using one or more data pre-processing systems, prediction models, or data post-processing systems. In some embodiments, using a natural language processing model may include determining one or more word scores, as described above. In some embodiments, the one or more prediction model may include an unsupervised prediction model. Alternatively, or in addition, the one or more prediction model may include a supervised prediction model. In some embodiments, a prediction model may include both one or more supervised prediction models and one or more unsupervised prediction models.

In some embodiments, the text block score may be used to measure whether a text block is on-topic or off-topic with respect to a document topic ("topic relevancy text block score"), where the document topic may be the one or more document topics described above for operation 314. In some embodiments, the system may use a statistical model to determine a score quantifying the relationship between a text block and the document topic. For example, the system may use LDA to determine the probability that a text block of a document is associated with one or more document topics of the document and assign a text block score to be equal to the probability or otherwise be based on the probability. As further described below, this text block score may then be used to determine whether a text block on-topic or not on-topic. In some embodiments, topics may be related to each other and this relationship may be used to determine a text block score. For example, a text block score between a text block and a first topic may be based on the probability that the text block is associated with a second topic, where the second topic is related to the first topic.

In addition, or alternatively, some embodiments may use a neural network model to determine a text block score that indicates whether a text block is on-topic or not on-topic. The neural network model may be trained using a set of training text blocks as training inputs and a set of training relevancy text block scores or a set of known topics as reference outputs (sometimes called "expected outputs"), where the reference outputs may be used to determine loss function values during neural network training. The system may then use the trained neural network model to determine network topic scores for new text blocks for any number of topics. Alternatively, or in addition, use of the trained neural network may include directly determining whether one or more criteria are satisfied. For example, as further described below block 324, some embodiments may include operations to determine whether a relevancy text block score In some embodiments, a text block score of a text block of a document may be determined based on whether the text block is related or unrelated to other text blocks of the document ("interblock text block score"). In some embodiments, a system may determine an interblock text block score based on a set of topic similarity values between a text block and the other text blocks of a document. For example, system may determine a list of the top five topics of each of a set of text blocks and then use a similarity model to determine the similarity between each of a set of text blocks. Various similarity models may be used to determine similarity values between different text blocks in order to determine an interblock text block score. Example similarity models may include a word mover's distance (WMD) models, Jaccardian similarity value, smooth inverse frequency models, pre-trained encoder models or other neural network models, cosine similarity, BERT embeddings, some combination of thereof (e.g., BERT embedding in combination with cosine similarity), or the like. For example, some embodiments may use a set of pre-trained encoders to determine a similarity score for each pair of a set of text block pairs and assign an interblock text block score to each text block based on the associated similarity scores. Various post-processing operations based on the similarity scores may be used to determine an interblock text block score. For example, an interblock text block score may be assigned to be equal to a measure of central tendency (e.g., mean average, median, mode) of a plurality of similarity scores of a text block. Alternatively, or in addition, an interblock text block score may be assigned to be equal to a maximum or minimum similarity score.

In some embodiments, a text block score may be determined based on whether the text block associated with the text block score is of interest or not of interest to a user of a user device accessing the document ("user-specific text block score"). Some embodiments may include operations to determine a user-specific text block score using a user-specific neural network. The user-specific neural network may be trained to determine specific parameters associated with the user. For example, the user-specific neural network may be trained using previously-accessed documents associated with a user and the text blocks of the previously-accessed documents indicated to have been read by the user. In some embodiments, the text blocks indicated to have been read the user may be determined based on one or more metrics of user focus. Metrics of user focus may include the amount of time that the text block stays on the screen (e.g., the amount of time being greater than or equal to a threshold amount of time or otherwise satisfying the threshold amount of time), based on a manual indication by the user that the text block is of interest, based on eye-tracking data determining the amount of time a user's eyes are viewing a text block, or the like. In some embodiments, the viewing times, eye-tracking viewing targets, or other metrics of user focus may be used individually or in combination to determine a user-specific focus score representing a likelihood that a user would read a text block. For example, the user-specific focus score may range from 0.0 to 1.0, where having a text block displayed on a screen for greater than 10 seconds or measuring that an eye is focused on the text block for greater than 5 seconds may increase the user-specific focus score of that text block. For example, a user-specific neural network may be trained based on a user-specific focus score determined using the amount of viewing time that text blocks are displayed on an electronic display (e.g., a computer monitor, tablet screen, phone screen, or the like) being used by the user.

In some embodiments, the system may use demographic data associated with the user to determine a user-specific text block score. For example, a user may be associated with the demographic group "DEMOGRAPHIC1," where all users in the demographic group "DEMOGRAPHIC1" are assigned a first set of parameters usable by a first user-specific neural network to determine user-specific text block scores for users in the group "DEMOGRAPHIC1." In some embodiments, the first user-specific neural network may be used in combination with additional user-specific neural networks to determine a user-specific text block score.

Once a user-specific neural network is available, the system may perform a lookup operation to retrieve a user profile to obtain a user-specific neural network or its associated user-specific parameters. For example, the system may determine that a user device is associated with a user, perform a lookup operation to retrieve a user profile, and determine that a neural network has been trained based on the user's past viewing behavior. The system may then use the trained neural network to compute user-specific text block scores for each text block in a document. The trained neural network may then be used to predict labels such as "of user interest" or "not of user interest" for each text block in a new document based on these viewing times (or other measurements of viewing behavior).

Various types of neural network training methods may be utilized to determine the parameters (e.g., weights, biases, etc.) of a neural network used to predict text block scores. In some embodiments, the training method may include a backpropagation training operation. During a backpropagation training operation, training a neural network may include initiating a neural network with either a random or transferred set of neural network parameters. The training may include passing a training input through the initiated neural network to determine a neural network prediction and comparing the neural network prediction to a reference output to determine a loss function value. The loss function value may then be propagated back via a backpropagation operation to update the parameters of the neural network using a gradient descent method. This process may be repeated during training to update the parameters of the neural network until the neural network prediction matches the reference output within an accuracy threshold.

For example, a set of user-specific focus scores that ranges between 0.0 (indicating no interest) and 1.0 (indicating high interest) for each of a training set of text blocks may be used for training a neural network. The set of user-specific focus scores may be initially computed based one or more data sources, such as an amount of time that a user's eyes are focused on a text block or an amount of time a text block is displayed on a view screen. The word scores of the training set of text blocks may be used as a set of training inputs and the set of user-specific focus scores may be used as a set of reference outputs. As described above, during training, the neural network may determine an initial set of focus scores and determine a loss function value by taking a difference between the initial set of focus scores and the reference outputs. The system may propagate the loss function value through the neurons of the neural network and re-calculate the neural network parameters using gradient descent. This process may be repeated until the trained neural network may predict the user-specific focus scores based on the training inputs within an accuracy threshold. Various other input data may be used for training input.

In an operation 320, the system may perform one or more operations indicated by operations 324, 330, 334, 324, or 338 for each respective text block of the text blocks of the document. In an operation 324, the system may determine whether a text block score associated with a respective text block satisfies one or more display criteria. Each of the text blocks may have one or more associated text block scores, and each text block score may have an associated score type with a corresponding set of display criteria (e.g., a topic relevancy display criterion, an interblock display criterion, a user-specific display criterion). For example, a topic relevancy text block score may be compared to one or more topic relevancy display criteria, an interblock text block score may be compared to one or more interblock display criteria, and a user-specific text block score may be compared to one or more user-specific display criteria. Each display criteria may have their own associated thresholds or other values. For example, some embodiments may include both an example topic relevancy display criterion and an example interblock display criterion. The example topic relevancy display criterion may include a probability threshold of 80%, where a topic relevancy text block score greater than 80% satisfies the topic relevancy display criterion. The example interblock display criterion may include a probability threshold of 90%, where only text blocks having interblock text block scores greater 90% satisfy the interblock display criterion.

In some embodiments, the text block may have an associated interblock text block score. For example, as described above, the interblock text block score of a first text block may be equal to a mean average (or other measure of central tendency) of the similarity scores between the first text block and other text blocks. In some embodiments, the interblock text block score may be compared to a numeric threshold of an interblock display criterion and determined to have satisfied the interblock display criterion if the interblock text block score is greater than the numeric threshold. Otherwise, the system may determine that the interblock text score has failed to satisfy the interblock display criterion.

In some embodiments, the text block may have an associated user-specific text block score. The user-specific text block score may be determined using one or more of the neural networks described above. In some embodiments, the output of the neural network used may be a label, such as "of interest to user" or "not of interest to user," and the user-specific criterion may be based on the label determined by the neural network. For example, the system may determine that a user-specific display criterion is satisfied if the text block score determined by a neural network is "of interest to user." Otherwise, the system may determine that the display criterion does not satisfy the text block score. Alternatively, or in addition, an output of the neural network may be a quantitative value used to determine whether the text block score satisfies a user-specific display criterion. For example, the system may determine that a user-specific display criterion having an associated threshold value of 50% is satisfied if a user-specific text block score determined by the neural network is greater than 50%. In some embodiments, the system may determine that a user-specific display criterion is satisfied or not satisfied based on a time of day. For example, the system may retrieve a first set of parameters for a user-specific neural network for a user during the time period between 6 AM to 6 PM and retrieve a second set of parameters for the user-specific neural network during the time period between 6 PM and 6 AM. By using different sets of parameters, different neural network outputs may be produced based on the time of day.

In some embodiments, the system may determine that a text block score for a text block does not satisfy the display criteria if one or more hiding criteria are satisfied. For example, some embodiments may include executing a subroutine to test if the text block includes one of a particular set of blacklisted words and, if so, determine that a hiding criterion is satisfied for the text block. The system may then determine that the text block score for a text block does not satisfy a display criterion because a text block hiding criterion is satisfied.

In an operation 330, the system may update a modified version of the document based on the text block. As used herein, updating a modified version of a document may include changing one or more values in an existing modified version of the document if the modified version already exists. Updating a modified version of a document may also include creating a modified version of the document if the modified version of the document does not exist. In some embodiments, multiple versions of the document may be created or changed concurrently. As used herein, a first document may be considered to be a modified version of a second document if the first document includes at least one sequence of words that is also in the second document while not being identical to the second document. In some embodiments, the first document and second document can be of different types. For example, a first document may be a modified version of a second document if the first document includes a web application that includes code written the Javascript programming language that cause a web browser to display three text blocks from a second document, where the second document is a static HTML file.

In some embodiments, the system may update the modified version of the document with an indicator indicating that the respective text block should be set as hidden in a presentation of the modified version of the document. Updating a modified version of the document with an indicator may include updating the modified version with an indicator tag. For example, some embodiments generate a modified version of the document using dynamic program that populates a template with text boxes that are initially displayed upon loading of the modified version, where text blocks indicated as hidden are not used to populate the text boxes. Alternatively, some embodiments may copy source code of a document written in a markup language such as HTML and modify the source code of the document with the indicator. The indicator may be a markup tag interpretable in the HTML5 software stack, such as <button> or <div class="panel">. For example, after a determination that the web document text block "<p>TEXT NOT SATISFY CRITERIA.</p>" does not satisfy one or more display criteria, the system may update a modified version of the web document to recite "<button class="accordion"><div class="panel"><p>TEXT DOES NOT SATISFY CRITERIA</p></class></button>".

In some embodiments, a text block of a document may be hidden during a presentation of a modified version of the document using dynamically-generated web code generated via one or more scripts, such as a script written in Javascript. Routines or tags hiding the text block may be considered to be indicators that set the text block to be hidden in a presentation of the document. In some embodiments, the Javascript script may be created using a web framework such as React, Vue, or Angular. For example, a web document may include a Javascript script inserted into a web document with the <App> tag, wherein the Javascript component may include code that instructs a web document to hide or show a text block based on a user interaction with a UI element. In some embodiments, user interaction with a UI element may include clicking or on a hyperlink, pressing on a button, letting a mouse hover over a region of a presentation of a web document, sliding a mouse or finger over a slider, making a hand gesture, or the like.

In some embodiments, a modified version of the document may be updated by generating or modifying a UI element of the modified version of the document to display a respective text block. In some embodiments, the modified version of the document may initially set the respective text block to be hidden before a user interacts with a UI element of the modified version of the document. After the user interacts with the UI element, the previously-hidden text block may be set to be viewable. For example, a presentation of a modified version of the document may initially have a first header "Header1" and a second header "Header2" directly beneath "Header1." A UI element "[+]" may, if pressed or otherwise interacted with, cause the modified version of the document to show a text block at a position in the presentation of the modified document where it was originally not present. For example, after pressing the UI element "[+]," a text block may be viewable in the modified document between "Header1" and "Header2."

In an operation 334, a summarization may be generated based on the respective text block. In some embodiments, the summarization may include a string that includes one or more words and be generated based on a set of rules. For example, the summarization may be generated using a rule that determines that a summarization is to include the first three words of the text block, an ellipsis, and the last three words of the text block. For example, the summarization for the string "The penguin is my favorite bird. It can swim and walk. I wish I had a pet penguin." may be summarized as "The penguin is . . . a pet penguin."

In some embodiments, the summarization may be generated using an extractive summarization model. For example, word scores for the words of a text block may be determined using one of the word scoring methods described above, such as using word2vec to determine word vectors as the word scores for the words. Alternatively, a summarization method may determine and use word scores that are different from the word scores generated above. The word scores may then be used to generate a summarization of the text block. For example, some embodiments may generate sentence embeddings for a sentence by determining weighted sums of the word vectors of the words in the sentence, where the weights may be inversely proportional to the frequency of word occurrence. Alternatively, some embodiments may generate a summarization using a skip-thought model, which may include using an encoder having a recurrent neural network (RNN) to determine an encoded representation of a sentence and pass the encoded representation to a decoder. The skip-thought encoder-decoder system may be trained using a data corpus that includes documents and the encoder output may be treated as a text block embedding vector. The sentence embedding vectors for each sentence of a text block may then be clustered to select one or more sentences that shares the greatest similarity with all other sentences, which may be a cluster center in the vector space of the sentences. One or more words from the selected set of sentences may then be used to generate a summarization.

In some embodiments, the summarization may be performed using an abstractive summarization model. In some embodiments, the abstractive summarization model may include the use of an RNN abstractive summarization model such as a sequence-to-sequence RNN model, which may take a text block as an input in the form of a sequence of strings. Using an RNN of the RNN abstractive summarization model may include determining a set of hidden state values based on the strings in the sequence of strings using an encoder neural network of the recurrent neural network. Each layer of the RNN may obtain, as an input, a hidden state value outputted from a previous layer of the RNN operating on a previous string in the sequence strings. For example, a first hidden state value computed by an RNN cell of the encoder neural network for a first string in a sequence of strings may be used as input for a second RNN cell of the encoder neural network to determine a second hidden state value for the next string in the sequence of strings. The system may then use a decoder neural network of the sequence-to-sequence RNN model to determine each word of a summarization string based on the output of the encoder neural network. For example, the RNN abstractive summarization model may include using a decoder neural network to decode an output of the encoder neural network to generate a first word of a summarization as well as a first decoder hidden state. The decoder neural network may then use the first decoder hidden state to generate a second word of the summarization in addition to a second decoder hidden state and proceed iteratively until each word of the summarization is generated using the decoder neural network. In some embodiments, the RNN abstractive summarization model may also include one or more attention values associated with some or all of the encoder hidden states to determine one or more words generated by the decoder neural network.

In some embodiments, generating a summarization of a text block using an abstractive summarization model may include using a transformer model to generate the summarization. Using a transformer model to summarize a text block may include determining a set of embedding vectors as word scores for words in the text block, where the word scores may be the same as the word scores determined above or be different from the word scores determined above. For example, the embedding vectors may be equal to the word scores determined above in the operation 308. In addition, the system may determine a set of positional encoding vectors, where each respective positional encoding vector is based on a position of a respective word in the first text block. Using the transformer model may include using an encoder neural network and a decoder neural network. The encoder neural network of the transformer model may include a multi-head attention model for performing self-attention operations to assign attention values to each of the words in text block. By performing self-attention operations, the attention values assigned to each word may be based on relations between words in the text block. In addition, the decoder neural network of the transformer model may include a masked multi-head attention model.

The system may perform self-attention by computing a set of key vectors, value vectors, and query vectors based on the set of embedding vectors and positional encoding vectors. In some embodiments, the key vectors, value vectors, and query vectors may be determined during a training operation of the transformer model. The system may then compute a set of attention values using a function that uses the set of key vectors, the set of value vectors, and the set of query vectors as parameters. In some embodiments, the function may include computing a product of a first element in the set of key vectors and a second element in the set of query vectors. For example, the function may include determining the dot product of a query vector of a first word with the key vectors each word, determining a root of the output, and normalizing the root of the output with a softmax activation function to determine a normalized score. The function may then multiply the normalized score with a value vector and sum each element of the multiplied value vector to determine an attention value for the first word. After determining the attention values for each word in a set of possible words to use for the summarization, the system may then generate the summarization based on the set of attention values. For example, the system may use each calculated attention value as well as other outputs from an encoder stack of the transformer model as inputs for a decoder stack, which may then be used to generate the summarization of the text block.

In some embodiments, generating the summarization using an abstractive summarization model may include using a pointer generation network model to generate the text block. In some embodiments, using a pointer generation network model may include determining a first value when determining a first string based on a vocabulary score distribution, wherein each score of the vocabulary score distribution may be associated with a string in a vocabulary database (e.g., a database of known strings). For example, the vocabulary distribution may be determined based on a context vector that is computed as a weighted sum of the elements of a vector representing the hidden states of an encoder neural network. Using the pointer generation network model may also include determining a second value when determining the first string based on an attention value score distribution, where each of the attention value score distribution is associated with a string in the first text block and may be determined using operations similar to those described above. Using the pointer generation network model may include determining a string selection score associated with the first string based on a weighted sum that includes the first value and the second value. A string to be used in a summarization may then be determined based on the string selection score. For example, the string selection score P(w) for a word w may be as defined below in Equation 1 may be used, where $p_{gen}$ is the probability that a new string is generated, $P_{vocab}$ is the first value from the vocabulary score distribution with respect to the word w, and a is the attention value score distribution, and where the string for a summarization may be determined based on a the set of string selection scores determined using Equation 1:

$$P(w) = p_{gen}P_{vocab}(w) + (1 - p_{gen})\sum_{i:w_i=w} a_i \qquad (1)$$

In some embodiments, the accuracy and conciseness of the summarization may be determined using a coverage loss value. A coverage loss calculation may be performed by determining a coverage vector for a position based on a sum of sets of previous attention vectors. Each set of the sets of previous attention vectors may be associated with a position in the summarization that is before the first position, and wherein each element of the coverage vector is associated with a string of the document. For example, when determining each word of a summarization, an attention distribution may include attention values, each of which may be calculated for a different word, and where the attention values may be determined as described above. When determining the next word of a summarization, a coverage vector for the next word may be determined by calculating a sum of the attention distributions determined for each previous word in the summarization. The coverage loss value for any word may then set to be the lesser value between the attention associated with the word and the coverage value in the coverage vector of that word. This coverage loss value may then be used as part of a loss function used to determine the next word for a summarization. By using a coverage loss value, the system may decrease the repetitiveness of a summarization, which may increase the conciseness of a modified version of a document.

In an operation 340, the modified version of the document may be updated based on the summarization. In some embodiments, the modified version of the document may be updated to include the summarization in a position proximate to the location of the hidden text, where text proximity may be defined by proximity to non-hidden text. For example, a first text block may be proximate to a second text block, such that no other text block is closer to the second text block than the first text block. Alternatively, or in addition, proximity may be defined based on point distance, where a first element may be proximate to a second element if a boundary of the first element is within 100 points of a boundary of the second element.

In some embodiments, the modified version of the document may be updated by inserting the summarization into a header tag. For example, if the summarization of a text block that reads "TEXT DOES NOT SATISFY CRITERIA," is "TEXT NOT SATISFY", the modified version of the document may be updated to include ""<button class="accordion"> TEXT NOT SATISFY <div class="panel"><p>TEXT DOES NOT SATISFY CRITERIA</p></class></button>."

In some embodiments, the modified version of the document may be updated to include the summarization in a position that is proximate to the position of a UI element. The UI element may, if interacted with, show the text block summarized by the summarization. In some embodiments, the UI element may be or otherwise include the summarization itself. For example, the UI element may be a hyperlink recites the summarization, where clicking or pressing on the hyperlink may show a text block beneath the hyperlink. In some embodiments, being proximate to an element may include overlapping with an element or being the element itself. For example, a summarization may be in proximity with a UI element if the summarization is the UI element or is otherwise included as part of the UI element. Alternatively, a summarization may be in proximity with a UI element if at least a portion of the summarization overlaps with the UI element. For example, if the text of a summarization overlaps with a button (or other UI element) that, if expanded, will display a text block beneath the button, the summarization is proximate to the text block.

In an operation 350, a determination of whether any additional text blocks are available for processing may be made. In some embodiments, a system may determine that additional text blocks are available based on a determination that a loop used to cycle through each text block has not reached a termination condition. In response to a determination that additional text blocks are available for processing, the method 300 may return to the operations of operation 320. Otherwise, operations of the method 300 may proceed to operation 354.

In an operation 354, the modified version of the document may be updated with one or more conciseness metrics. In some embodiments, the conciseness metrics may include a ratio indicating an amount of words that have been hidden relative to an amount of words that have not been hidden. For example, after performing operations 320-350, the system may have set two text blocks of a document out of five text blocks of the document to be hidden in a presentation of a modified version of the document. If the total number of words of the document is 1000 words, and the two text blocks to be hidden is 250 words, then the total number of words not set to be hidden is 750 words. A first conciseness metric may be the ratio of non-hidden words to total words (i.e. 75%), and a second conciseness metric may be a ratio of the hidden words to total words (i.e. 25%). The total number of words in the document may be determined based on the total number of words in the non-hidden text blocks and the total number of words in the hidden text blocks, and both the first conciseness metric or second conciseness metric are types of ratios of the number of hidden words to the number of non-hidden words. In some embodiments, the conciseness metrics may be displayed at the top of the visual display or on a sidebar of a web document presentation.

In some embodiments, the modified version of the document may also be updated to include an additional UI element that, when interacted with, causes an application displaying the modified version of web document to show a second version of the web document that does not include one or more components of the modified version. For example, the second version of the web document may be an unmodified version of the web document, and interaction with the additional UI element may cause a web browser executing on a user device to show the unmodified version of the web document. The unmodified version of the web document may be loaded directly from source code retrieved from a universal resource locator (URL) associated with the web document, and may be free of any UI elements or summarization added into the modified version of the web document. Alternatively, the second version of the web document may be a differently-modified version of the web document that does not include one or more of the UI elements or summarizations described above, and interaction with the additional UI element may load the differently-modified version of the web document. For example, interaction with the additional UI element may cause an application to display a differently-modified version of the web document that includes a previously-hidden text block without requiring any user interaction with any UI elements encoded in or otherwise stored in the differently-modified version of the web document. Alternatively, or in addition, the differently-modified version of the web document may hide or otherwise not display a summarization that was previously displayed in a first modified version of the web document.

In an operation 358, the modified version of the document may be provided to a user device. As described above, the user device may be any type of electronic device that includes or is connected to a graphical display, such as a desktop computer, laptop, tablet device, phone, other mobile computing device, home interface device, smart screen device, or the like. In some embodiments, the system may send the modified version of the user device in the form of a web application that includes Javascript code, cascading stylesheet (CSS), and HTML data. For example, if an initial document includes a first text block, second text block, and third text block, a modified version of a document may be sent in the form a web application that stores the first, second, and third text block as constants with the names "textBlock1," "textBlock2," and "textBlock3" in Javascript code. The system may determine that textBlock2 should be set as hidden and include instructions to display only the text stored in textBlock1 and textBlock3 when the web application is initially loaded. The web application may include an interactive button having a summarization of the text associated with textBlock2 stored in the text.

In an operation 362, one or more error indicators may be obtained from the user device and used to further train the prediction system. In some embodiments, the modified version of the document may include button or other interactive elements for a user to indicate that a text block is not properly categorized. For example, a first text block of a document that is initially hidden from a user after a modified version of the document is loaded may be associated with a first button that, if pressed, indicates that the user would have preferred to see the first text block upon loading. In addition, a second text block of the document that is not initially hidden from a user may be associated with a second button that, if pressed, indicates that the user would have preferred to not see the second text block upon loading. Each respective error indicator indicating a respective text block that a user has selected as being incorrectly labeled may be sent to a computer system such as the computer system 102 to train one or more models used by the prediction subsystem 112.

After obtaining the set of error indicators, one or more prediction models may be re-trained to modify the parameters of the prediction model based on the text blocks that were indicated by a user to have been incorrectly shown or hidden. For example, if a first error indicator indicates that a first text block of a document was hidden and a second error indicator indicates that the second text block of the document was incorrectly shown, a neural network of the prediction model may be re-trained, where the training input includes the first and second text block and the reference output includes the indication that the first text block is to be shown and the second text block is to be set as hidden.

In some embodiments, the prediction model (or other part of a natural language processing model) may obtain parameters via transfer learning or otherwise use parameters from other natural language processing models. For example, a first natural language processing model may use a first set of parameters (e.g., weights, biases, number of encoder layers, etc.) to provide a modified version of a first document to a first user device, and a second natural language processing model may use the same first set of parameters to provide a modified version of a second document to a second user device. In some embodiments, prediction model parameters (or other parameters of a natural language processing model) associated with different users may be used to determine parameters of another prediction model. In some embodiments, the prediction model may apply differential privacy methods to anonymize parameters associated with users. For example, parameters associated with a first natural language processing model and parameters associated with a second natural language processing model may be anonymized and combined (e.g., averaged), before being used in conjunction with random data to determine parameters of a third natural language processing model. In some embodiments, a natural language processing model may be used to predict whether a document that has not yet been accessed by a user would be of interest to a user based on a ratio calculated for the natural language processing model.

In some embodiments, the various computers and subsystems illustrated in FIG. 1 may include one or more computing devices that are programmed to perform the functions described herein. The computing devices may include one or more electronic storages (e.g., e.g., prediction database(s) 132, which may include data corpus database(s) 134, model database(s) 136, user database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory, computer-readable storage media that electronically stores information. The storage media of the electronic storages may include one or both of (i) system storage that is provided integrally (e.g., substantially non-removable) with servers or user devices; or (ii) removable storage that is removably connectable to the servers or user devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from user devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems or other components described herein is for illustrative purposes, and is not intended to be limiting, as any of subsystems other components may provide more or less functionality than is described. For example, one or more of subsystems may be eliminated, and some or all of its functionality may be provided by other ones of the subsystems.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. As used in this application, updating data may include modifying data already stored in a storage or creating the data and storing the newly-created data in storage.

The present techniques will be better understood with reference to the following enumerated embodiments:

1. A method comprising: obtaining a document comprising a plurality of words; using a model to generate a plurality of text block scores for text blocks in the document, wherein a first text block of the text blocks is associated with a first text block score of the plurality of text block scores; updating a modified version of the document based on the first text block; and providing the modified version of the document to a user device associated with a user.

2. The method of embodiment 1, further comprising generating a summarization based on the first text block, wherein the modified version of the document comprises the summarization.

3. The method of embodiment 1 to 2, wherein the document is a first web document, and wherein the method further comprises obtaining user-specific focus scores from a second web document; and determining a set of parameters used by the first neural network by training the first neural network, wherein the training comprises using word scores based on each of the text blocks from the second web document as training inputs and the user-specific focus scores as reference outputs.

4. The method of embodiment 3, wherein the user-specific focus scores are determined based on an amount of time that a respective text block from the second web document is displayed on a graphical display.

5. The method of any of embodiments 1 to 4, the method further comprising determining a document topic based on the words of the document using an unsupervised learning model, wherein using the first neural network comprises determining the first text block score based on the document topic.

6. The method of any of embodiment 1 to 5, wherein providing the modified version of the document to the user device comprises providing the modified version of the document to the user device in response to the user device sending a request to access the document.

7. The method of any of embodiments 1 to 6, wherein each of the plurality of words of the document is delimited from other words of the document based a whitespace character or a punctuation character.

8. The method of any of embodiments 1 to 7, wherein updating the modified version of the document based on the first text block comprises updating the modified version of the document to comprise a first user interface element that, when interacted with, causes the modified version of the document to display the first text block in a presentation of the modified version of the document.

9. The method of any of embodiments 1 to 8, wherein updating the modified version of the document comprises updating the modified version of the document to comprise an indicator associated with the first text block to set the first text block as a hidden text block in a presentation of the modified version.

10. The method of any of embodiments 1 to 9, wherein updating the modified version of the document comprises updating the modified version of the document in response to the first text block score for the first text block failing to satisfy a criterion.

11. The method of any of embodiments 1 to 10, wherein the first text block comprises a sequence of words.

12. The method of any of embodiments 2 to 11, wherein generating the summarization comprises: for each respective word of the first text block, determining, by one or more processors, a respective word score, wherein each respective word is delimited from other words of the first text block based on a whitespace character or a punctuation character; and selecting, by one or more processors, a first word associated with a word score based on a comparison of word scores with each other, wherein the summarization comprises the first word.

13. The method of any of embodiments 2 to 11, wherein generating the summarization based on the first text block comprises generating the summarization using a recurrent neural network, and wherein the first text block is provided to the recurrent neural network as a sequence of strings, and wherein using the recurrent neural network comprises: determining, by one or more processors, a first hidden state value based on a first string of the sequence of strings using an encoder neural network of the recurrent neural network; determining, by one or more processors, a second hidden state value based on a second string of the sequence of strings and the first hidden state value using the encoder neural network; and determining, by one or more processors, the summarization string based on the second hidden state value.

14. The method of any of embodiments 2 to 12, wherein the summarization comprises a string, wherein generating the summarization based on the first text block comprises: determining, by one or more processors, a set of embedding vectors, wherein each of the set of embedding vectors is associated with a word of the first text block; determining, by one or more processors, a set of positional encoding vectors, wherein each respective positional encoding vector of the set of positional encoding vectors is determined based on a position of a respective word in the first text block; determining, by one or more processors, a set of key vectors, a set of value vectors, and a set of query vectors based on the set of embedding vectors and positional encoding vectors; determining, by one or more processors, a set of attention values using a function that uses the set of key vectors, the set of value vectors, and the set of query vectors as parameters, wherein using the function comprises computing a product of a first element in the set of key vectors and a second element in the set of query vectors; and determining, by one or more processors, the summarization based on the set of attention values.

15. The method of embodiment 13, wherein the set of attention values is associated with a first position in the summarization, and wherein the method further comprises: determining, by one or more processors, a coverage vector based on a sum of sets of previous attention vectors, wherein each set of the sets of previous attention vectors is associated with a position in the summarization that is before the first position, and wherein each element of the coverage vector is associated with a string of the document; and determining, by one or more processors, a string in the summarization based on the coverage vector.

16. The method of any of embodiments 1 to 15, further comprising: determining a first value is based on a total number of words from each respective text block not associated with an indicator to set the respective text block as a hidden text block in the presentation of the modified version of the document; determining a second value is based on a total number of words from each respective text block associated with a respective indicator to set the respective text block as a respective hidden text block in the presentation of the modified version of the document; and determining a ratio between the first value and the second value, wherein providing the modified version of the document comprises providing the ratio.

17. The method of any of embodiments 1 to 16, further comprising obtaining, by one or more processors, a set of error indicators, wherein each respective error indicator of the set of error indicators is associated with a respective text block of the text blocks and indicates that a user associated with the user device has selected the respective text block; determining a set of selected text blocks of the document based on the set of error indicators; and training, by one or more processors, the first prediction model based on the set of selected text blocks.

18. The method of any of embodiments 1 to 17, wherein the plurality of text block scores is a first plurality of text block scores, and wherein the criterion is a first criterion, and wherein the method further comprises: determining, by one or more processors, a second plurality of text block scores for the text blocks in the document using a neural network, wherein the second plurality of text block scores comprises a second text block score that is associated with the first text block; determining, by one or more processors, whether the second text block score satisfies a second criterion, wherein the second criterion is different from the first criterion.

19. The method of any of embodiments 1 to 18, wherein the modified version of the document further comprises a criterion indicator associated with the first text block, and wherein the criterion indicator indicates the first text block score not satisfying the first criterion or the second text block score not satisfying the second criterion.

20. The method of any of embodiments 2 to 19, wherein generating the summarization comprises: determining, by one or more processors, a first value for a first string based on a first score distribution, wherein each score of the first score distribution is associated with a string in a database of known strings; determining, by one or more processors, a second value for the first string based on a second score distribution, wherein each score of the second score distribution is associated with a string in the first text block; determining, by one or more processors, a string selection score associated with the first string based on a sum of the first value and the second value; and generating, by one or more processors, the summarization based on the string selection score.

21. The method of any of embodiments 1 to 20, wherein the model comprises a natural language model.

22. The method of any of embodiments 1 to 21, further comprising obtaining a user record associated with the user; obtaining a list of terminology associated with the user record, wherein the list of terminology comprises a first listed string; and determining that a second text block score satisfies the criterion by determining that a second text block used to determine the second text block score comprises the first listed string.

23. The method of any of embodiments 1 to 22, wherein the natural language model is a first natural language model, and using the first natural language model comprises using a first set of parameters for the first natural language model, and wherein the operations further comprising: obtaining a second set of parameters used by a second natural language model; and training the first natural language model to determine the first set of parameters based on the second set of parameters.

24. The method of any of embodiments 1 to 23, wherein the document comprises markup tags comprising a pair of brackets, the operations further comprising determining the text blocks based on the markup tags.

25. The method of any of embodiments 1 to 24, further comprising obtaining a time of day, wherein using the natural language model comprises using the natural language model to generate the plurality of text block scores based on the time of day.

26. The method of any of embodiments 1 to 25, further comprising obtaining a set of previously-accessed documents associated with the user, wherein the set of previously-accessed documents comprising a first subset of previously-accessed documents and a second subset of previously-accessed documents, wherein an access timestamp of the first subset of previously-accessed documents is less than an access timestamp of the second subset of previously-accessed documents; and training a neural network to predict a set of documents, wherein the neural network is trained by using the first subset of previously-accessed documents as training inputs and using the second subset of previously-accessed documents as reference outputs; using the neural network to determine a set of documents that comprises the first document; and wherein using the natural language model to generate the plurality of text block scores comprises using the natural language model to generate the plurality of text block scores before the user device sends the request to access the document.

27. The method of any of embodiments 2 to 26, wherein generating the summarization comprises generating the summarization of the first text block based on the words in the first text block in response to the first text block score failing to satisfy the criterion.

28. The method of any of embodiments 2 to 27, wherein the summarization is proximate to the hidden first text block in the modified version.

29. The method of any of embodiments 2 to 28, wherein the summarization is proximate to user interface element.

30. The method of any of embodiments 2 to 29, wherein the presentation of the modified version comprises a second user interface element that, when interacted with, causes an application displaying the presentation of the modified version to display of a second version of the web document after retrieving the first text block from a universal resource locator of the web document, wherein the second version of the web document displays the first text block without additional interaction with any user interface elements encoded in the second version of the web document.

31. A non-transitory, computer-readable media storing instructions that, when executed by one or more processors, effectuate operations comprising the methods of any of embodiments 1 to 30.

32. A system for facilitating conciseness of a web document presentation, the system configured to effectuate operations comprising the methods of any of embodiments 1 to 30.

What is claimed is:

1. A system for facilitating conciseness of a web document presentation comprising one or more memory devices storing instructions and one or more processors configured to execute the instructions that, when executed, cause operations comprising:
responsive to a user accessing a web document comprising a first sequence of words and a second sequence of words, retrieving a user profile of the user;
obtaining a set of parameters for a prediction model based on the user profile, wherein the set of parameters is one set of different parameter sets that correspond with different users, and wherein the set of parameters is generated by a training operation of the prediction model using previously accessed documents read by the user;
using the prediction model configured with the set of parameters to generate a score based on the first sequence of words;
presenting a modified version of the web document on a user device of the user by: in response to the score failing to satisfy a display criterion, using a second prediction model to generate a summarization of the first sequence of words for the modified version of the web document based on the first sequence of words;
generating the modified version of the web document to comprise the summarization of the first sequence of words, the second sequence of words, and a user interface element that, when interacted with, shows the first sequence of words; and presenting the modified version on the user device such that the presentation of the modified version hides the first sequence of words and displays the second sequence of words, the summarization, and the user interface element.

2. The system of claim 1, wherein the modified version of the web document further comprises a criterion indicator associated with the first sequence of words, and wherein the criterion indicator indicates the score not satisfying the display criterion.

3. The system of claim 1, wherein generating the modified version of the web document comprises generating a set of indicator tags around the first sequence of words in the web document.

4. The system of claim 1, wherein:
the user interface element is a first user interface element; and
presenting the modified version comprises presenting a second user interface element that, when interacted with, causes an application displaying the presentation of the modified version to:
retrieve a second version of the web document comprising the first sequence of words from a universal resource locator of the web document; and
display the second version of the web document.

5. The system of claim 1, wherein the score is a first numeric score, the operations further comprising:
obtaining a list of terminology associated with the user profile, wherein the list of terminology comprises a first listed text string;
determining a second numeric score based on a third sequence of words of the web document; and
determining that the second numeric score satisfies the display criterion by determining that the third sequence of words used to determine the second numeric score comprises the first listed text string.

6. The system of claim 1, wherein the web document is a first web document, and wherein the prediction model comprises a neural network, the operations further comprising:
determining a third score based on a first amount of time that a user's eye focused on a third sequence of words of a second web document and a fourth score based on a second amount of time that the user's eye focused on a fourth sequence of words of the second web document; and
configuring the set of parameters based on the second web document by training the neural network based on the third score and the fourth score, wherein the set of parameters comprises neural network parameters of the neural network.

7. The system of claim 1, wherein obtaining the set of parameters comprises:
determining that the user is associated with a group of users; and
obtaining at least one parameter of the set of parameters based on the group of users.

8. A method comprising:
retrieving a set of parameters associated with a user based on a profile of the user, wherein the set of parameters is one set of parameter sets that correspond with different users, and wherein the set of parameters is generated by a training operation of a prediction model using previously accessed documents accessed by the user;
obtaining a document comprising a first set of words and a second set of words;

using the prediction model configured with the set of parameters to generate a score based on the first set of words; and
causing a modified version of the document to be presented on a user device by:
in response to a result of a determination of whether the score satisfies a criterion, generating a summarization of the first set of words for the modified version of the document based on the first set of words;
updating the modified version of the document to comprise the summarization, the second set of words, and a user interface element that, when interacted with, causes the user device to display of the first set of words; and
wherein a presentation of the modified version on the user device hides the first set of words and displays the second set of words, the summarization, and the user interface element.

9. The method of claim 8, wherein the score is a first score, and wherein the prediction model comprises an unsupervised learning model, the method further comprising determine a first document topic and a second document topic based on text of the document using the unsupervised learning model, wherein determining the first score comprises determining the first score based on the first document topic.

10. The method of claim 8, wherein:
the summarization comprises a summarization string;
generating the summarization comprises providing a neural network with a sequence of strings of the first set of words as inputs; and
using the neural network comprises:
determining a first hidden state value based on a first string of the sequence of strings using the neural network;
determining a second hidden state value based on a second string of the sequence of strings and the first hidden state value using the neural network; and
determining the summarization string based on the second hidden state value using the neural network.

11. The method of claim 8, wherein the document is a first document, further comprising: obtaining a second document;
determining an amount of time that a third set of words from the second document is displayed on a graphical display; and
configuring the set of parameters by training a neural network based on the amount of time.

12. The method of claim 8, wherein generating the summarization comprises:
determining a set of embedding vectors, wherein each of the set of embedding vectors is associated with a word of the first set of words;
determining a set of positional encoding vectors, wherein each respective positional encoding vector of the set of positional encoding vectors is determined based on a position of a respective word in the first set of words;
determining a set of key vectors, a set of value vectors, and a set of query vectors based on the set of embedding vectors and positional encoding vectors;
determining a set of attention values using a function that uses the set of key vectors, the set of value vectors, and the set of query vectors as parameters, wherein using the function comprises computing a product of a first element in the set of key vectors and a second element in the set of query vectors; and determining the summarization based on the set of attention values.

13. The method of claim 8, wherein providing the modified version of the document to the user device comprises providing the modified version of the document to the user device in response to the user device sending a request to access the document.

14. The method of claim 8, wherein:
the prediction model is a first prediction model;
the set of parameters is a first set of parameters; and
the method further comprising:
obtaining a second set of parameters used by a second prediction model; and training the first prediction model to determine the first set of parameters based on the second set of parameters.

15. A non-transitory computer-readable medium comprising instructions that, when executed by one or more processors, cause operations comprising:
obtaining a set of parameters associated with a user based on a profile of the user, wherein the set of parameters is one set of parameter sets that correspond with different users, and wherein the set of parameters is generated by a training operation of a prediction model using previously accessed documents accessed by the user;
obtaining a document comprising a first set of strings and a second set of strings;
using the prediction model configured with the set of parameters to generate a score based on the first set of strings; and
causing a modified version of the document to be presented on a user device by:
in response to a result of a determination of whether the score satisfies a criterion, generating a summarization based on the first set of strings;
updating the modified version of the document to comprise the summarization and the second set of strings; and
wherein a presentation of the modified version of the document on the user device hides the first set of strings and displays the summarization and the second set of strings.

16. The medium of claim 15, wherein updating the modified version of the document comprises using a script to dynamically generate web code.

17. The medium of claim 15, wherein:
generating the modified version of the document comprises generating a user interface element, wherein a distance between the user interface element and the summarization is less than or equal to 100 points; and
an interaction with the user interface element causes the modified version of the document to display the first set of strings.

18. The medium of claim 15, wherein the document comprises markup tags comprising a pair of brackets, the operations further comprising determining the first set of strings and the second set of strings based on the markup tags.

19. The medium of claim 15, the operations further comprising obtaining a time of day, wherein using the prediction model comprises using the prediction model to generate the score based on the time of day.

20. The medium of claim 15, wherein generating the summarization comprises: determining a first value for a first string of the first set of strings based on a first score distribution, wherein each score of the first score distribution is associated with a string in a database of strings;
determining a second value for the first string based on a second score distribution, wherein each respective score of the second score distribution is associated with a respective string of the first set of strings;
determining a string selection score associated with the first string based on a sum of the first value and the second value; and
generating the summarization based on the string selection score.

* * * * *